July 9, 1963  W. H. BENNETT  3,097,341
CIRCUIT FOR PRODUCING SQUARE WAVE PULSES BY PARALLEL
CAPACITORS DISCHARGING THROUGH LOAD
AT DIFFERENT RATES
Original Filed Oct. 30, 1961
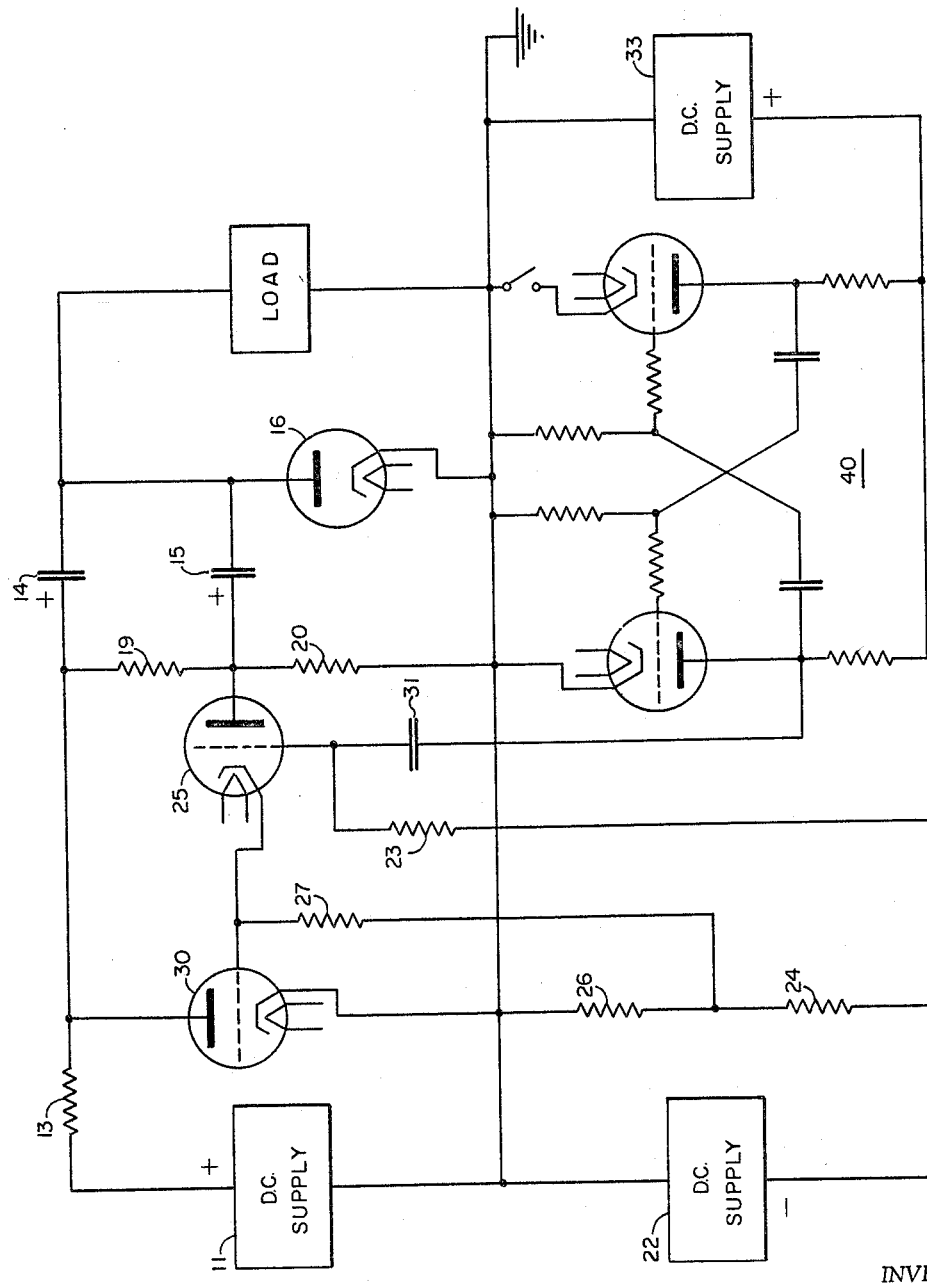
INVENTOR
WILLARD H. BENNETT
BY
ATTORNEY

United States Patent Office 3,097,341
Patented July 9, 1963

3,097,341
CIRCUIT FOR PRODUCING SQUARE WAVE PULSES BY PARALLEL CAPACITORS DISCHARGING THROUGH LOAD AT DIFFERENT RATES
Willard H. Bennett, 5032 Kaplan Drive, Raleigh, N.C.
Original application Oct. 30, 1961, Ser. No. 148,776. Divided and this application Apr. 26, 1962, Ser. No. 190,513
6 Claims. (Cl. 328—67)
(Granted under Title 35, U.S. Code (1952), sec. 266)

The invention described herein may be manufactured and used by or for the Government of the United States of America for governmental purposes without the payment of any royalties thereon or therefor.

The present invention is a division of my application, Serial No. 148,776, filed October 30, 1961 for "Means for Producing Focused High Density Electron Streams," and is directed to a circuit for producing square wave high voltage pulses for use generally where firmly regulated square wave high voltage pulses are desired and more particularly for the production of such pulses for times of the order of a millisecond.

Existing circuits for supplying high voltage pulses have several disadvantages among which are the use of very bulky coupling capacitors and the production of pulses which are not truly square but have a slope of finite amount which is generally undesired.

Accordingly, it is an object of the present invention to provide a circuit for the production of firmly regulated square wave pulses.

It is another object of this invention to provide a circuit for the production of firmly regulated high voltage square wave pulses, the circuit being adaptable to produce square wave pulses of any voltage.

It is a further object of the present invention to provide a circuit for producing square wave high voltage pulses in which the capacitors included are of relatively small size.

It is a further object of this invention to provide a circuit for the production of square wave high voltage pulses in which the pulse delivered to the load has a flat bottom or a substantially flat bottom.

It is a further object of the present invention to provide a circuit for the production of square wave high voltage pulses whose duration is of the order of one millisecond and which does not include the use of large value and bulky capacitors.

Other objects and many of the attendant advantages of this invention will be readily appreciated as the same becomes better understood by reference to the following detailed description when considered in connection with the accompanying drawing in which rectifier 11 delivers current through resistance 13 charging condensers 14 and 15, the other side of each of the condensers being connected to ground through diode 16. Resistors 19 and 20 serve as potential dividers, the resistance of 20 in general being larger than the resistance of 19. A second rectifier 22 applies a negative potential through resistor 23 to the grid of triode 25 thereby rendering the triode nonconducting during the time that the condensers are being charged, and during the time that no current is being applied to the load. Resistors 24 and 26 serve as a potential divider so that a negative potential is also applied through resistor 27 to the grid of a second triode 30 thereby rendering that triode nonconducting also during the charging time.

Through condenser 31 a positive triggering pulse can be applied to the grid of triode 25. The positive triggering pulse can originate either with the discharge of a condenser to ground, or from rectifier 33 which is used to activate a multivibrator circuit 40. Alternatively, the triggering pulse can be obtained from any of a large number of other pulsing circuits familiar to anyone skilled in the art.

When the grid of triode 25 is pulsed positive, that triode becomes conducting and the cathode approaches the potential of the anode of triode 25. In doing so, the grid of triode 30 is flung positive and triode 30 becomes conducting abruptly moving the potential of the high voltage side of capacitor 14 toward ground and driving the previously grounded side of capacitor 14 to a high negative potential. The previously grounded side of capacitor 14 is directly tied to the corresponding side of capacitor 15 so that the previously high voltage side of 15 is driven towards ground potential. This moves the plate of triode 25 towards ground potential carrying the potential of the cathode of triode 25 with it towards ground potential thereby carrying the potential of the grid of triode 30 towards ground potential and, in fact, past ground potential towards a negative potential until the current through triode 30 becomes limited. The foregoing cooperative action has the result of applying a firmly regulated square wave voltage to the load as further explained in the following paragraphs. The value of the square wave voltage is the voltage across the condenser 15. By providing resistors 23 and 27 with high values of resistance and also by making the potential dividers, resistors 19 and 20, have high resistances, the drain on capacitor 15 is not very great and in consequence, the potential that is placed across the load is made to be very nearly equal to the potential across capacitor 15. This is true although a considerable current is being drained out of capacitor 14 with the result that the potential across 14 might be dropping steeply. The square pulse cannot be maintained, of course, beyond the time that the potential across capacitor 14 has decreased to the value of the potential across capacitor 15.

As soon as the triggering potential is terminated, provided, of course, that this is done before the voltage of capacitor 14 has fallen too near to that of capacitor 15, the grid of triode 25 swings back to the negative potential from rectifier 22 making the grid of triode 25 swing to the negative potential from the potential dividers resistances 24 and 26, thereby rendering the triode 30 nonconducting. The rectifier 11 again begins to charge up condensers 14 and 15.

A triode, not shown, may be connected between resistance 13 and rectifier 11 to prevent overloading of rectifier 11 when condensers 14 and 15 are discharging. The value of resistor 13 may be selected so that maximum current will pass through such a triode even at full voltage of rectifier 11, such current not to exceed the current reading of rectifier 11. The current regulating triode would have its anode connected to rectifier 11, its cathode connected to resistance 13, and its grid connected to the anode of triode 30.

The multivibrator indicated generally at 40 is a pulse generator to which power is supplied from rectifier 33 to provide a positive pulse large enough to drive the grid of triode 25. In the circuit of my application, Serial No. 148,776, a positive pulse of one millisecond duration at 25 kv. was supplied by the multivibrator. Triode 25 operates as a cathode follower, with the plate voltage dropping so that the amount of current that triode 25 can supply is limited by the voltage at the output or load terminals. Triode 30 does not draw current to the point of saturation, the positive voltage at triode 25 being applied through the cathode of 25 to the grid of triode 30 increasing the current through triode 30 to a particular point which produces the desired negative output pulse.

Triode 25 is in effect used as a switch and tests the voltage at the originally grounded side of capacitor 15. If the voltage at that side of capacitor 15 should try to rise, such rising voltage will be transmitted through capacitor 15 to the anode of triode 25. This in turn provides a greater positive drive on the grid of triode 30 which produces a decreasing voltage at its anode. That is, the increasing voltage at the originally grounded side of capacitor 15 will appear as an increasing ground potential at the grid of triode 30 and a decreasing ground potential at the anode of triode 30. Triode 30 thus draws a heavy current load during the pulse.

At the condition of no voltage at the output terminals no current in triodes 25 and 30 appears because of the negative voltage at the grids thereof. In the circuit of my application, Serial No. 148,776, the voltage at the anode of triode 30 at that time is approaching 30 kilovolts and the voltage at the anode of triode 25 approaches ⅝ of the voltage at the anode of triode 30.

The virtually flat-bottomed pulse at the load or output terminals is obtained, therefore, by the current which flows through coupling capacitor 14 into the load producing a change in voltage across capacitor 14. Normally this change in voltage would produce increasing slope, however, by feeding a decreasing slope into capacitor 14 a virtually flat pulse is obtained at the load or output terminals. Also, a slight rise in current at triode 30 is amplified by triode 30 thus giving a negatively changing voltage at the anode of triode 30. In actual practice, an exceedingly slight rise is realized at the output form of the voltage which is seen as a slight increase in the plate voltage at triode 25 and a slight increase of the grid voltage at triode 30.

Obviously, many modifications and variations of the present invention are possible in the light of the above teachings. It is therefore to be understood that within the scope of the appended claims the invention may be practiced otherwise than as specifically described.

What is claimed is:

1. Circuit means for pulsing a flow of current at high voltage at a selected repetition rate and pulse duration comprising a high-voltage D.-C. supply, a voltage divider having a plurality of taps connected in parallel with said supply, a capacitor and a diode in series with one of said taps and ground, a second capacitor in series with another tap and the junction of said diode and capacitor, current control means connected across said supply between a tap and ground, said control means responsive to an input voltage to provide a variable impedance across said supply, switching means connected between said control means and a tap to control the input voltage to said control means, and a load connected in parallel with said diode whereby said control means is made conducting reciprocally in response to the discharge of said capacitors thereby producing a pulse of substantially constant magnitude to said load.

2. Circuit means for pulsing a flow of current at high voltage at a selected repetition rate and pulse duration comprising a high-voltage D.-C. supply, a voltage divider having a plurality of taps connected in parallel with said supply, a capacitor and a diode in series with one of said taps and ground, a second capacitor in series with another tap and the junction of said diode and capacitor, current control means connected across said supply between a tap and ground, said control means responsive to an input voltage to provide a variable impedance across said supply, switching means connected between said control means and a tap to control the input voltage to said control means, said switching means including a pulse generator for supplying a pulse of selected duration to trigger discharge of said capacitors, and a load connected in parallel with said diode whereby said control means is made conducting reciprocally in response to the discharge of said capacitors thereby producing a pulse of substantially constant magnitude to said load.

3. The device claimed in claim 1 wherein said control means and said switching means are first and second triodes, respectively, the grid of said first triode connected to the cathode of said second triode, the anode of said first triode connected to the positive side of said supply, the anode of said second triode connected to the lower charged of said capacitors, and a second high-voltage D.-C. supply having its negative side coupled to the grids of said triodes.

4. Circuit means for pulsing a flow of current at high voltage at a selected repetition rate and pulse duration comprising a high-voltage D.-C. supply, high-voltage high-current control means connected in parallel with said high-voltage supply, said control means responsive to an input voltage and providing a variable impedance across said supply, a pair of capacitors connected in parallel with each other and in series with said supply through a diode, said diode so polarized as to permit said supply to charge said capacitors, first impedance means connected in series with said capacitors to provide differential charging thereof, switching means connected between the lower charged of said capacitors and said control means to control the input voltage to said control means, second impedance means connected between the junction of said switching means and lower charged capacitor and ground to prevent discharge of said lower charged capacitor to ground, and a load in parallel with said diode whereby said control means is made conducting reciprocally in response to the discharge of said capacitors thereby producing a high-voltage pulse of substantially constant magnitude to said load.

5. Circuit means for pulsing a flow of current at high voltage at a selected repetition rate and pulse duration comprising a high-voltage D.-C. supply, high-voltage high-current control means connected in parallel with said high-voltage supply, said control means responsive to an input voltage and providing a variable impedance across said supply, a pair of capacitors connected in parallel with each other and in series with said supply through a diode, said diode so polarized as to permit said supply to charge said capacitors, first impedance means connected in series with said capacitors to provide differential charging thereof, switching means connected between the lower charged of said capacitors and said control means to control the input voltage to said control means, second impedance means connected between the junction of said switching means and lower charged capacitor and ground to prevent discharge of said lower charged capacitor to ground, said switching means including a pulse generator for supplying a pulse of selected duration to trigger discharge of said capacitors, and a load in parallel with said diode whereby said control means is made conducting reciprocally in response to the discharge of said capacitors thereby producing a high-voltage pulse of substantially constant magnitude to said load.

6. The device claimed in claim 5 wherein said control means and said switching means are first and second triodes, respectively, the grid of said first triode connected to the cathode of said second triode, the anode of said first triode connected to the positive side of said supply, the anode of said second triode connected to the lower charged of said capacitors, and a second high-voltage D.-C. having its negative side coupled to the grids of said triodes.

References Cited in the file of this patent
UNITED STATES PATENTS
2,439,223    Schade _____ Apr. 6, 1948